May 16, 1967   W. H. REICH   3,319,348
APPARATUS AND METHOD FOR TRANSPORTING
WARM, MOISTURE LADEN GOODS
Filed Feb. 1, 1965   2 Sheets-Sheet 1

INVENTOR
WILBURT H REICH

BY *Kenneth E. Prince*
ATTORNEY

May 16, 1967

W. H. REICH 3,319,348

APPARATUS AND METHOD FOR TRANSPORTING
WARM, MOISTURE LADEN GOODS

Filed Feb. 1, 1965

INVENTOR
WILBURT H. REICH

BY *Kenneth E Prince*

ATTORNEY

United States Patent Office 3,319,348
Patented May 16, 1967

3,319,348
APPARATUS AND METHOD FOR TRANSPORTING WARM, MOISTURE LADEN GOODS
Wilburt H. Reich, Franklin Park, N.J., assignor to W. R. Grace & Co., New York, N.Y., a corporation of Connecticut
Filed Feb. 1, 1965, Ser. No. 429,434
9 Claims. (Cl. 34—42)

This invention relates to new and improved apparatus and method. In particular, it relates to an improved cargo container especially adapted for the transporation of coffee beans, and to the method of transporting green coffee beans therein.

The use of unitized cargo containers for the shipment of freight by sea, air, rail and truck has become increasingly important in recent years. This is primarily due to ever increasing handling costs, especially labor costs. While container shipments of many products are quite satisfactory, some problems still remain in adapting this mode of transportation to other products. Thus, the carriage of freight through varying atmospheric conditions frequently results in physical and/or chemical damage to the freight because of overheating, moisture vapor condensation inside the freight container, and the like. These problems become particularly aggravated when the freight is a product such as raw coffee beans which must be shipped from humid regions where they are grown or produced to destinations in cooler climates.

The procedures for transporting raw coffee beans from their place of harvest, e.g., Colombia, to warehouses and roasters in the United States has remained basically unchanged since the early 1900's. These traditional procedures present many opportunities for damage to the coffee while it is in transit from the plantation to the ultimate receiver's warehouse or roasting plant.

The use of presently known cargo containers alleviates some of these problems with respect to the transportation of coffee. Thus, the use of containers permits pre-loading of the bagged coffee beans prior to the arrival of the ship upon which the coffee is to be loaded. The container loading can therefore generally be accomplished during the daylight hours when conditions are most favorable for accurate inspection because of good lighting and the decreased tempo of loading. Once in the container, which can be sealed, the coffee is protected from the elements virtually indefinitely.

Nevertheless, a serious problem still remains even though the coffee is shipped by way of cargo container. The warm, moist beans in the coffee bags generally have a temperature of about 80° Fahrenheit or so. The beans, which are hygroscopic, give up water as vapor which condenses on the container side walls and top wall when these walls are cooled below the dew point of the atmosphere within the container. Since the beans are loaded in a warm humid climate the dew point is seldom much below the dry bulb air temperature at the time of loading. In consequence, only a small temperature drop results in a rather serious condensation problem. Such temperature changes can occur when passing to a colder climate while in transit or when unloading the containers (from, e.g., a ship's hold) onto a dock at a port such as New York city in the fall and winter months. Condensation on the inside of the container walls is the inevitable result when these temperature changes occur. As condensation accumulates on the container top or side walls it either drips onto the coffee or runs down the side walls until it contacts a bag of beans.

In an attempt to control the condensation, experiments have been conducted in which the holds of the ship in which the containers were loaded had a controlled humidity. Condensation could not be adequately controlled in this manner.

It is a general object of this invention to provide a new and improved freight container.

Another object of this invention is to provide an improved freight container which prevents water damage to the freight regardless of any condensation that may take place during transporation.

A specific object of the invention is to provide a freight container for the transportation of coffee beans which avoids, in an inexpensive manner, the serious problem previously existing and maintains the bagged coffee beans in top condition from the time they are placed into the container until the time they are removed, thus substantially precluding shipping losses due to moisture problems.

Another specific object is to provide a method of transporting raw coffee beans.

Sitll further objects and the many advantages of the present invention will become obvious to those skilled in the art in view of the following description.

It has been found that the above objectives are attained by a freight container comprising bottom, top and main side walls; air-pervious secondary side walls substantially coextensive with, inside of and wholly spaced from the main side walls, providing an air space therebetween; opposed water impervious and imperforate ceiling panels wholly spaced from the top wall and overlying at least the space bounded by the secondary side walls, said panels converging at least slightly upwardly toward the top wall of the container and arranged to provide an air space therebetween as well as between the panels and the top wall; and means, in the space between the main side walls and the secondary side walls and below the lower-most portion of the ceiling panels to conduct fluids in said space to the outside of the container.

In the method of this invention the warm moist air emanating from the coffee beans rises to the top of the container and flows into the space between the main side walls and air pervious secondary side walls. When the temperature of the top and main side walls decreases to the dew point of the moisture-laden air condensation takes place on these members. This results in a decrease in the vapor pressure at these points which causes the warm, moist air inside the container to flow from inside the container through the air-pervious secondary side walls and also to the space between the top and the ceiling panels. Moisture continues to condense until equilibrium is established. Any moisture condensed on the container top falls onto the ceiling panels and flows to the side where it, together with moisture condensed on the main side walls, flows through the annular space between these walls and the secondary side walls and out of the bottom of the container. In this manner any possible damage to the coffee beans as a result of condensation is greatly alleviated or totally eliminated.

The invention will be better understood after reference is made to the accompanying drawings (which illustrate the essential features of the presently preferred embodiment of the freight container) and the detailed description thereof.

Figure 1:
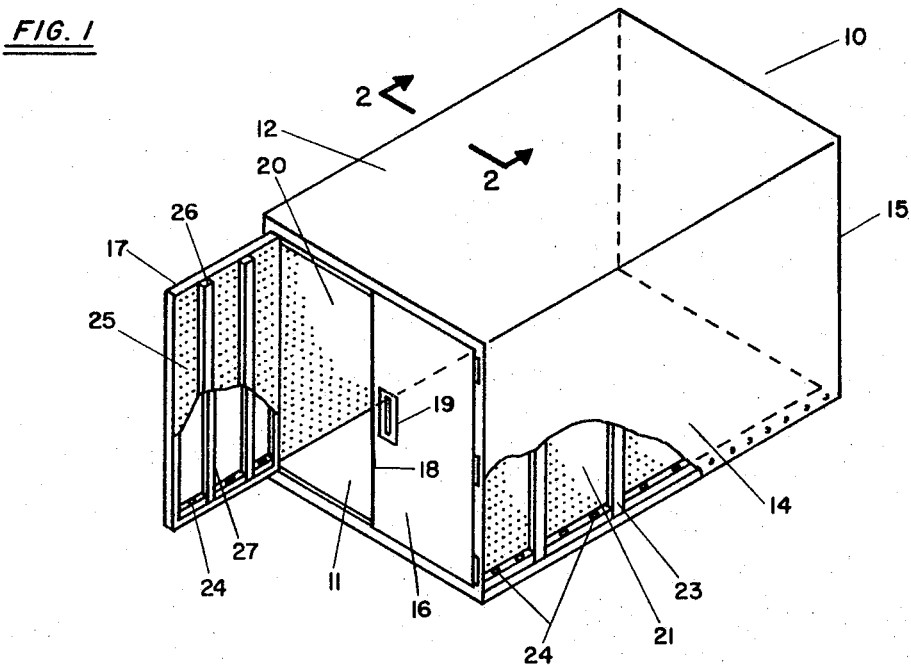
FIGURE 1 is a perspective view of the container partially broken away to show certain details.

Referring to the drawings, the numeral 10 identifies a freight container having a generally right angle parallelepiped shape. The floor or base 11 illustrated has a rectangular plane configuration. Suitable corner posts (not shown) are provided at each corner extending upward to support the top wall 12 of the container. Side walls 13 and 14 and end wall 15 can be of any suitable construction. Opposite end wall 16 is comprised of a pair of doors 17, 18 suitably hinged on the side wall and latchable as at 19, for example, to permit access to the interior of the freight container. All of the elements of the freight container described so far are conventional in the art. Further accessory elements to permit stacking of the containers one upon another and permitting movement of the containers by cargo slings, hooks, or the like, as well as by forklift trucks, will also usually be provided in the containers of the invention. Means for accomplishing this construction are so well-known in the art that they need not be specifically described herein. For the purposes of completeness, reference is made to Smith et al., U.S. Patents 2,457,841 and U.S. 2,457,842, each granted Jan 4, 1949, the entire disclosures of which are incorporated herein by reference thereto. Of course, sling means and stacking means other than those specifically described in the two Smith et al. patents referred to may be used.

The specific improvements to which this invention is directed include air-pervious secondary side walls 20, 21 and 22 secured to plural sleeper studs 23 which are in turn suitably secured to the exterior side and end walls 13, 14 and 15, respectively. There is thus provided between the air-pervious secondary side walls and the main side walls a plurality of annular spaces 50. There is similarly provided on each of the doors 17 and 18 which form the opposite end wall of the container secondary air-pervious walls, such as wall 25, secured in the same manner by sleeper studs 27.

On each of the secondary air-pervious walls of the doors there are placed vertical spacing strips 26 of a suitable size and location to provide a tight lading with minimum shifting of the freight placed in the container. A plurality of drain holes 24 are bored through the bottom wall in the annular space between the main and secondary side walls to permit condensed moisture to run out of the container and also to permit breathing in the annular space. At least one hole is placed between each pair of sleeper studs 23—23 or 27—27. These drain holes are preferably covered with screens or the like to prevent ingress of insects and vermin.

Figure 2:
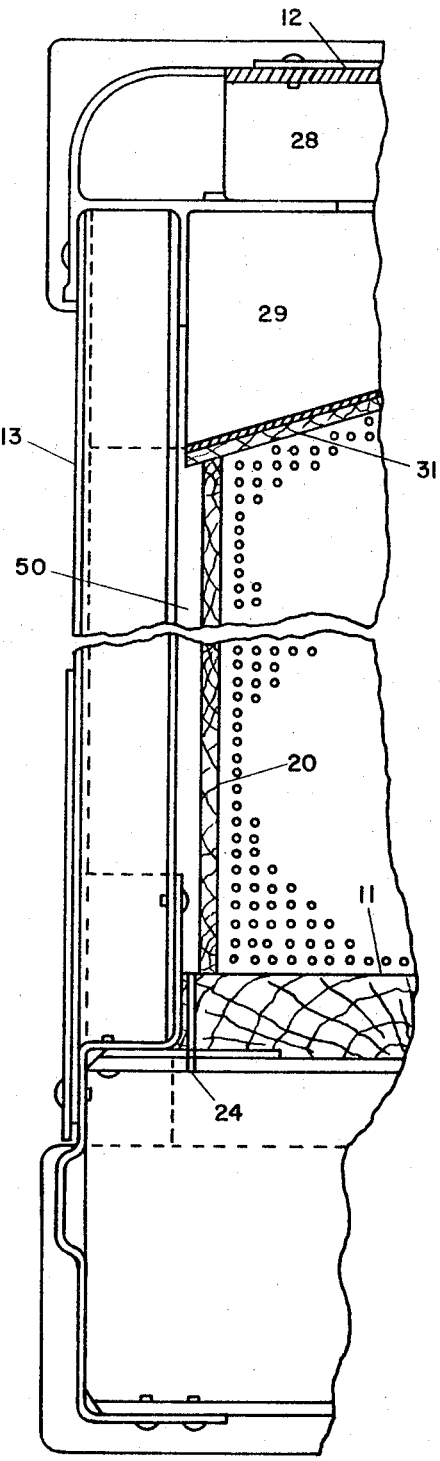
FIGURES 2 and 2a are sectional views taken generally along line 2—2 of FIGURE 1.
Figure 2A:
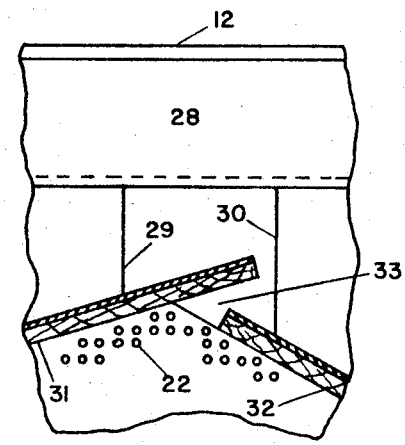

Mounted between the main side walls are a plurality of roof bows 28. Secured to the underside of the roof bows are opposed moulding strips 29 and 30. On the underside of the moulding strips there are mounted opposed water-impervious imperforate ceiling panels 31 and 32. As best seen in FIGURE 2a, the secondary ceiling panels converge from the sides of the container toward the top, and overlap each other in spaced relation so as to provide a longitudinal slot 33 therebetween running the length of the container. The ceiling panels are of a size to cover at least all of the space bounded by the upper periphery of the air-pervious secondary side walls, previously described. In the illustrated embodiment, the outer edges of each of the ceiling panels extends at least slightly beyond the top edge of the secondary side walls 20 and 21, upon which the panels rest. The top wall 12 of the container is secured to the roof bows to complete the construction.

Materials used in construction of the containers will depend upon the size and strength desired for the particular application in mind. In the preferred embodiment the main side walls and main top wall have been made of aluminum sheets having a thickness not less than about 1/16 of an inch. The container should be of interior post construction so as to present a flush exterior. The floor or bottom wall of the embodiment illustrated has been shown as made of hardwood, tongue and groove, secured with screws, bolts or the like. Any other suitable floor could, of course, be used. The double doors forming end wall 16 are, in the preferred embodiment, constructed of heavy ply metal construction utilizing steel hinges and hinge pins. Heavy-duty hard rubber should be used around the outer edges of the doors as gasketing to assure good weather tightness. All joints should be caulked to provide an overall moisture-tight structure, except for the drain holes 24, described above, which permit egress of internally condensed moisture.

The air-pervious secondary side walls may be composed of any suitable material such as plywood, Masonite or the like. The heat insulating properties of the secondary side walls can be increased by utilizing therefore a laminate comprising 1/4 inch plywood panels between which there is sandwiched, e.g., foam or other suitable insulating substance. The ceiling panels may also be of plywood or Masonite. Preferably these panels comprise aluminum-clad plywood wherein the aluminum side is placed facing the top 12. A highly insulating panel comprising a laminate of, e.g., 1/4 inch plywood, a 3/4 inch layer of polyurethane foam, and a thin (e.g., .040 inch) aluminum sheet similarly placed could also be used. It has been found that quite satisfactory results are achieved with plywood secondary side walls and aluminum-clad ceiling panels so that it is usually unnecessary to go to the expense of utilizing highly insulating laminates such as those mentioned.

The air-pervious secondary side walls can be made pervious in any suitable manner. In the embodiment illustrated, these walls are made pervious by boring therethrough a multiplicity of small (e.g., 1/4 inch) holes 40. In one suitable embodiment plywood walls having throughout 1/4 inch holes spaced on one-inch centers have been used.

The specific spacing between the main side walls and the secondary side walls is not particuularly critical, so long as free air flow can occur through the annular spaces between the walls. In experimental containers 1/4 inch spacing has been provided at the main side and end walls and one-inch spacing has been provided at the double doors 17 and 18, with entirely satisfactory results.

Figure 3:
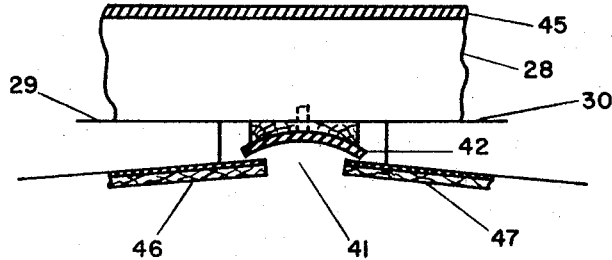
FIGURE 3 is a partial sectional view of an alternate construction for the ceiling liner.
Figure 4:
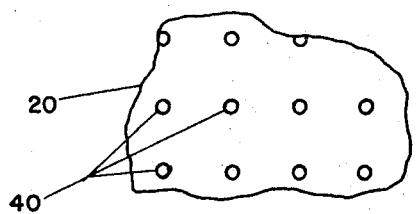
FIGURE 4 is a magnified plan view of a small portion of the side wall liners.

In an alternate embodiment the ceiling panels can be arranged as illustrated in FIGURE 3. In this embodiment the panels do not overlap, but terminate a short distance from each other, leaving a horizontal gap 41 therebetween. An inverted gutter 42 is secured over and extends for the full length of gap 41. Thus air is still permitted to flow into the space between the top 45 and the panels 46, 47; but the gutter 42 prevents re-entry of any condensed water into the cargo carrying space beneath the panels 46, 47.

Figure 5:
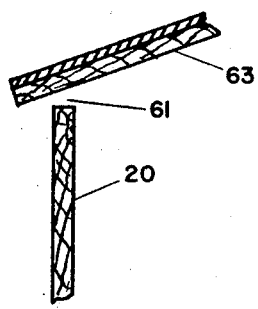
FIGURE 5 is a detail view schematically illustrating an alternate construction at the eaves of the ceiling liner.

In still another alternate embodiment, illustrated in FIGURE 5, longitudinal slots 61 are provided at the eaves of the ceiling panels 63 as well as the slot adjacent the center of the container to give better air circulation over the top of the coffee cargo. This is not however a critical requirement so that eave slots may be used or not, as desired.

While the invention has been described with particular reference to shipment of coffee beans, it will, of course, be fully understood that other carrgo may be transported in the containers of this invention. Furthermore, it will be understood that these containers are suitable for use in transportation of goods by ship, barge, truck, rail or air as may be required.

The foregoing description has of necessity been quite detailed. It is intended that the scope of the invention be determined solely by the scope of the appended claims.

What is claimed is:

1. Method for protecting warm, moist freight from condensation damage while in transit to cooler destinations comprising:
    placing said freight in a cargo space peripherally bounded by walls which are highly perforated and highly air-pervious throughout substantially their entire area; and covered by moisture impervious upwardly converging opposed ceiling panels;

surrounding said walls and ceiling panels with an outer closed shell spaced therefrom permitting flow of warm, moist air in said cargo space into the space between said outer shell and said walls and ceiling panels whereby any moisture condensation which takes place will occur on the surfaces of said shell which condensation will in turn cause further quantities of warm, moist air to flow from the cargo space into the space between the shell and the said walls and ceiling panel;

continuing said air flow and condensation until equilibrium is established; and draining condensed moisture out of the space between the shell and the said walls and ceiling panels.

2. Method as defined in claim 1 wherein said freight comprises bagged raw coffee beans.

3. Freight container comprising bottom, top and main side walls, secondary side walls substantially coextensive with, inside of, and spaced from the main side walls, providing an annular air space therebetween; said secondary side walls being highly air-pervious throughout substantially their entire area; opposed moisture-impervious, imperforate ceiling panels overlying at least the space bounded by the upper periphery of the secondary side walls, said panels converging at least slightly upwardly toward the said top wall and arranged to provide overlapping in spaced relation below the plane of the top wall, so as to provide an air space therebetween as well as between the said panels and the top wall; and means in the space between the main side walls and the secondary side walls, and below the lower-most portion of the said ceiling panels, to conduct fluids in said space to the outside of said container.

4. Container of claim 3 wherein at least one of the main walls comprises double doors to permit access.

5. Container of claim 3 wherein said air-pervious secondary side walls are highly perforated panels.

6. Container of claim 3 wherein said means to conduct fluids to the outside of said container comprises a plurality of holes drilled through the bottom wall.

7. Container of claim 3 wherein said ceiling panels extend at least partially beyond the upper edge of the secondary side walls and into the annular space between the said side walls and the main side walls.

8. Container of claim 7 wherein a longitudinal slot is provided at the eaves of the said ceiling panels.

9. A container comprising:
(a) bottom, top and main side walls, at least one of which walls is constructed to permit access to the interior of the container;
(b) for each side wall, a highly perforated air-pervious secondary side wall substantially coextensive with, inside of, and wholly spaced from its respective main side wall, providing an annular air space therebetween; each of said side walls being connected at its bottom edge to the said bottom wall and at its two side edges to an edge of two other secondary side walls;
(c) a pair of imperforate, moisture-impervious ceiling panels, overlying at least the space bounded by the secondary side walls, said panels each coextensive with and connected to the top edge of one of a pair of opposed secondary side walls and having a side edge at least partially extending beyond the top of the secondary side wall to which it is connected into the air space between the said wall and its respective main side wall;
(d) said secondary ceiling panels converging at least slightly upwardly toward the said top wall and overlapping at a point between the said opposed secondary side walls and below the top wall so as to provide an air space therebetween and between each of said panels and the said top wall;
(e) and drain holes, in the area of the bottom wall between the main side walls and their respective secondary side walls, and below the lowermost portion of the said secondary ceiling panels, to conduct fluids in said space to the outside of said container.

References Cited by the Examiner
UNITED STATES PATENTS

| | | | |
|---|---|---|---|
| 2,192,933 | 3/1940 | Saborsky | 220—9 |
| 2,368,837 | 2/1945 | Hubacker | 220—9 |
| 2,529,621 | 11/1950 | Mayo. | |
| 3,118,559 | 1/1964 | Stricker | 220—9 |

FREDERICK L. MATTESON, Jr., *Examiner.*

D. A. TAMBURRO, *Assistant Examiner.*